E. A. SCHAFER.
BOLT AND RETAINER THEREFOR.
APPLICATION FILED MAR. 24, 1919.

1,395,526.

Patented Nov. 1, 1921.

INVENTOR.
Edward A. Schafer.
BY H. E. Dunlap
ATTORNEY.

UNITED STATES PATENT OFFICE.

EDWARD A. SCHAFER, OF WHEELING, WEST VIRGINIA.

BOLT AND RETAINER THEREFOR.

1,395,526.   Specification of Letters Patent.   Patented Nov. 1, 1921.

Application filed March 24, 1919. Serial No. 284,758.

*To all whom it may concern:*

Be it known that I, EDWARD A. SCHAFER, a citizen of the United States of America, and resident of Wheeling, county of Ohio, and State of West Virginia, have invented certain new and useful Improvements in Bolts and Retainers Therefor, of which the following is a specification.

This invention relates to bolt retainers, and it has for its primary object to provide a bolt and a securing device therefor designed particularly to replace the ordinary forms of threaded bolts and nuts in places where they are subjected to such vibration that the nuts tend to loosen and retract on their bolts.

A further object is to provide a bolt and a retainer therefor adapted for use in places not readily accessible, which cannot be separated by chance and which, therefore, require no attention following introduction.

In describing the invention in detail, reference is had to the accompanying drawings, in which—

Figure 1:
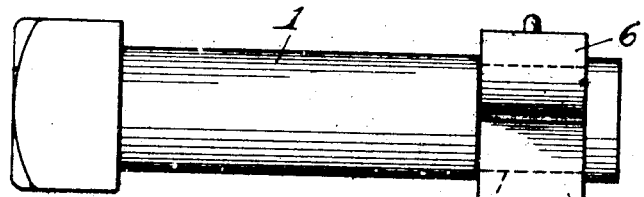
Figure 1 is a side elevation of the bolt with the retainer applied thereto, said retainer being shown in front end elevation.
Figure 2:
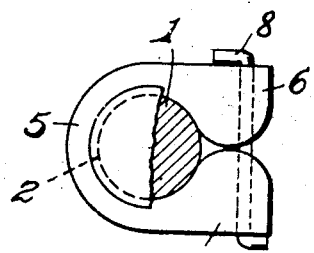
Fig. 2 is a sectional end elevation of the bolt with the retainer applied thereto, said retainer being shown in side elevation.
Figure 3:
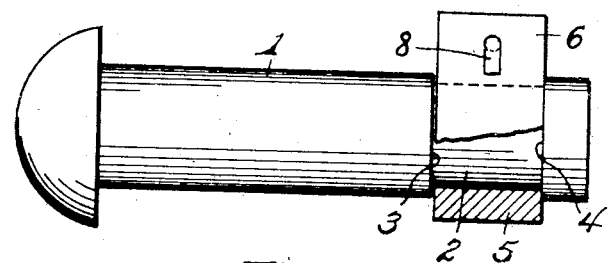
Fig. 3 is a view similar to Fig. 1 showing the retainer partly in top plan and partly in broken section; and—

Referring to said drawings, 1 indicates the body of a bolt which is provided at a suitable distance from its point with a reduced neck portion 2 defined at its inner and outer ends by shoulders 3 and 4. Said neck portion is designed to receive thereon a clamp-like bolt-retainer of approximately C-shape, said retainer being formed of a single piece of metal and consisting of a resilient band-like body 5 terminated at opposite ends by jaw-like portions 6.

In its operative position the retainer is disposed in closely embracing relation to the neck portion 2 of the bolt. The body 5 of said retainer is of relatively greater thickness than the depth of the annular channel which is cut in the bolt in producing said neck portion, and the jaw-like portions 6 project a considerable distance away from the bolt. Obviously, therefore, the inner face of the retainer abuts against the adjacent face of a wall or web penetrated by the bolt in precisely the same manner as does the inner face of a nut applied to ordinary forms of threaded bolts, and the shoulder 4 of the bolt constitutes a bearing against which the retainer seats and which positively prevents any withdrawal of the retainer with respect to such wall or web.

Figure 4:
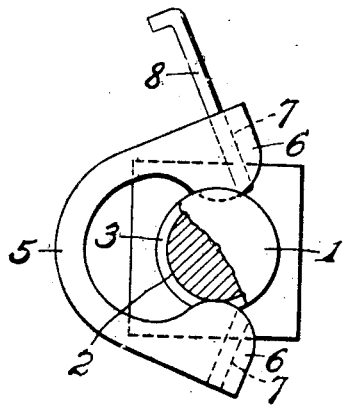
Fig. 4 is a view similar to Fig. 2, showing the retainer jaws occupying the positions assumed when the retainer is being slipped upon the bolt.

In applying the device, the jaws 6 are separated somewhat and being introduced in the channel, as indicated in Fig. 4, the device is driven forward. Application of the device is facilitated by rounding the adjacent faces of the jaws. Due to the resilient character of the device, the jaws will resume approximately their normal relative positions after application, but should they not do so, they may be readily drawn to such positions by means of a suitable tool. Each of said jaws has a hole 7 provided therein, said holes being in alinement when the jaws occupy their normal position and being adapted for the reception of a suitable pin, as 8, by means of which said normal position of the jaws may be maintained.

What is claimed is:—

1. A bolt retainer comprising, in combination with a bolt having an annular channel formed therein adjacent to its point, a clamp-like bolt-retainer of approximate C-shape disposed in closely embracing relation to said channel, the body of said retainer being of relatively greater thickness than the depth of said channel, said retainer terminating in jaws of greatly increased thickness provided with rounded adjacent faces adapted to facilitate disposal of said retainer within and removal of it from said channel, said retainer being adapted to be sprung around said channel into a position in which said jaws lie in engagement, and means for securing said jaws together for maintaining said retainer in position.

2. A bolt retainer comprising, in combination with a bolt provided adjacent to its point with a reduced neck portion defined at its inner and outer ends by shoulders, a clamp-like bolt-retainer of approximate C-shape formed of a single piece of metal and consisting of a resilient band-like body terminated at opposite ends by jaws, said body being of relatively greater thickness than the depth of said neck portion, said jaws being considerably thicker than said body and having their adjacent faces rounded to facilitate application of said retainer into and removal from said neck portion, said retainer being adapted to be sprung over said neck portion into a position in which the rounded faces of said jaws lie in engagement with each other, and a pin extending through both of said jaws for maintaining said retainer in position in said neck portion.

In testimony whereof, I affix my signature in presence of two subscribing witnesses.

EDWARD A. SCHAFER.

Witnesses:
A. L. DUNLAP,
H. E. DUNLAP.